United States Patent [19]

Antich et al.

[11] Patent Number: 5,281,821
[45] Date of Patent: Jan. 25, 1994

[54] POSITION SENSITIVE GAMMA RAY DETECTOR

[75] Inventors: Peter P. Antich, Richardson; Jon A. Anderson, Plano; Robert W. Parkey, Irving, all of Tex.

[73] Assignee: Board of Regents, The University of Texas System, Austin, Tex.

[21] Appl. No.: 784,593

[22] Filed: Oct. 29, 1991

Related U.S. Application Data

[63] Continuation-in-part of Ser. No. 433,617, Nov. 9, 1989, Pat. No. 5,103,098.

[51] Int. Cl.$^5$ .............................................. G01T 1/20
[52] U.S. Cl. ................................... 250/368; 250/367; 250/366
[58] Field of Search ................... 250/368, 366, 367

[56] References Cited

U.S. PATENT DOCUMENTS

| | | | |
|---|---|---|---|
| 3,978,337 | 8/1976 | Nickles et al. | 250/367 |
| 4,677,299 | 6/1987 | Wong | 250/367 |
| 4,749,863 | 6/1988 | Casey et al. | 250/368 |
| 4,788,436 | 11/1988 | Koechner | 250/483.1 |
| 4,823,016 | 4/1989 | Yamashita et al. | 250/363.03 |
| 4,829,185 | 5/1989 | Cerff | 250/361 R |
| 4,942,302 | 7/1990 | Koechner | 250/368 |
| 4,973,845 | 11/1990 | Mastrippolito et al. | 250/368 |
| 4,983,841 | 1/1991 | Stewart | 250/358.1 |
| 5,103,098 | 4/1992 | Fenyves | 250/368 |
| 5,103,099 | 4/1992 | Bourdinaud et al. | 250/368 |
| 5,150,394 | 9/1992 | Karellas | 250/483.1 |

FOREIGN PATENT DOCUMENTS

| | | |
|---|---|---|
| 57-76466 | of 1982 | Japan. |
| 60-159675 | of 1985 | Japan. |
| WO85/04959 | 11/1985 | World Int. Prop. O. ........ 250/367 |

OTHER PUBLICATIONS

Atac et al., "High Resolution Scintillating Fiber Gamma Ray Detectors for Medical Imaging", Abstracts, IEEE Joint Nuclear Science Symposium and Medical Imaging Conference, No. 5M9, 38 (1990).

Antich et al., Nucl. Instr. and Methods, A297:514–520 (1990).

Antich et al., IEEE Transactions on Nuclear Science, 38(2):568–573 (1991).

Atac et al., Abstracts, IEEE Joint Nuclear Science Symposium and Medical Imaging Conference, No. 5M9,38 (1990).

Chaney et al., Abstracts, IEEE Joint Nuclear Science Symposium and Medical Imaging Conference, No. 5M8, 38 (1990).

Singh, Med. Phys., 10(4):421–435 (1983).

Uchida et al., IEEE Transactions on Nuclear Science, 33(1):464–467 (1986).

Chaney, SPIE 1159:18–26 (1989).

Atac et al., SPIE 1161:178–188 (1989).

Atac et al., Nuclear Physics B (Proc. Suppl.) 10B:139–142 (1989).

Atac et al., Proc. First International Symposium on the Super Collider, 699–707 (Feb. 1989).

Fenyves et al., SPIE 879:29–36 (1988).

(List continued on next page.)

*Primary Examiner*—Carolyn E. Fields
*Assistant Examiner*—Drew A. Dunn
*Attorney, Agent, or Firm*—Arnold, White & Durkee

[57] ABSTRACT

An apparatus and method are disclosed for detecting and locating the origin of a gamma ray in a medical diagnostic imaging system. At least one primary fiber, which is a scintillating optical fiber, is positioned to receive radiation from a gamma ray source. At least one secondary fiber intersects the primary fiber at a non-zero angle and is in optical contact with the primary fiber. Both the primary and secondary fibers are provided with means for detecting light propagated in the fibers. The interaction of a gamma ray with the primary fiber will result in the propagation of light in both the primary and secondary fibers, thereby permitting the determination of the site of impact of the gamma ray in the detector, and possibly also enabling the determination of the path of incidence of the gamma ray.

18 Claims, 8 Drawing Sheets

OTHER PUBLICATIONS

Petroff et al., IEEE Transactions on Nuclear Science, 36(1):163–164 (1989).

Buchsbaum et al., Schizophrenia Bulletin, 13(1):115–132 (1987).

Lancaster et al., Computers and Physics, 16–22 (Sep.–Oct. 1988).

Langham, Texas Times, 43–45 (1985).

Andreasen, Science, 239:1381–1388 (1988).

Brownell et al., Science, 215:619–626 (1982).

Blumenfeld et al., "Plastic Fibers in High Energy Physics", 603–606 (Elsevirer Science Publishers).

Ghosh, J. Nuclear Medicine, 31(2):20A–28A (1990).

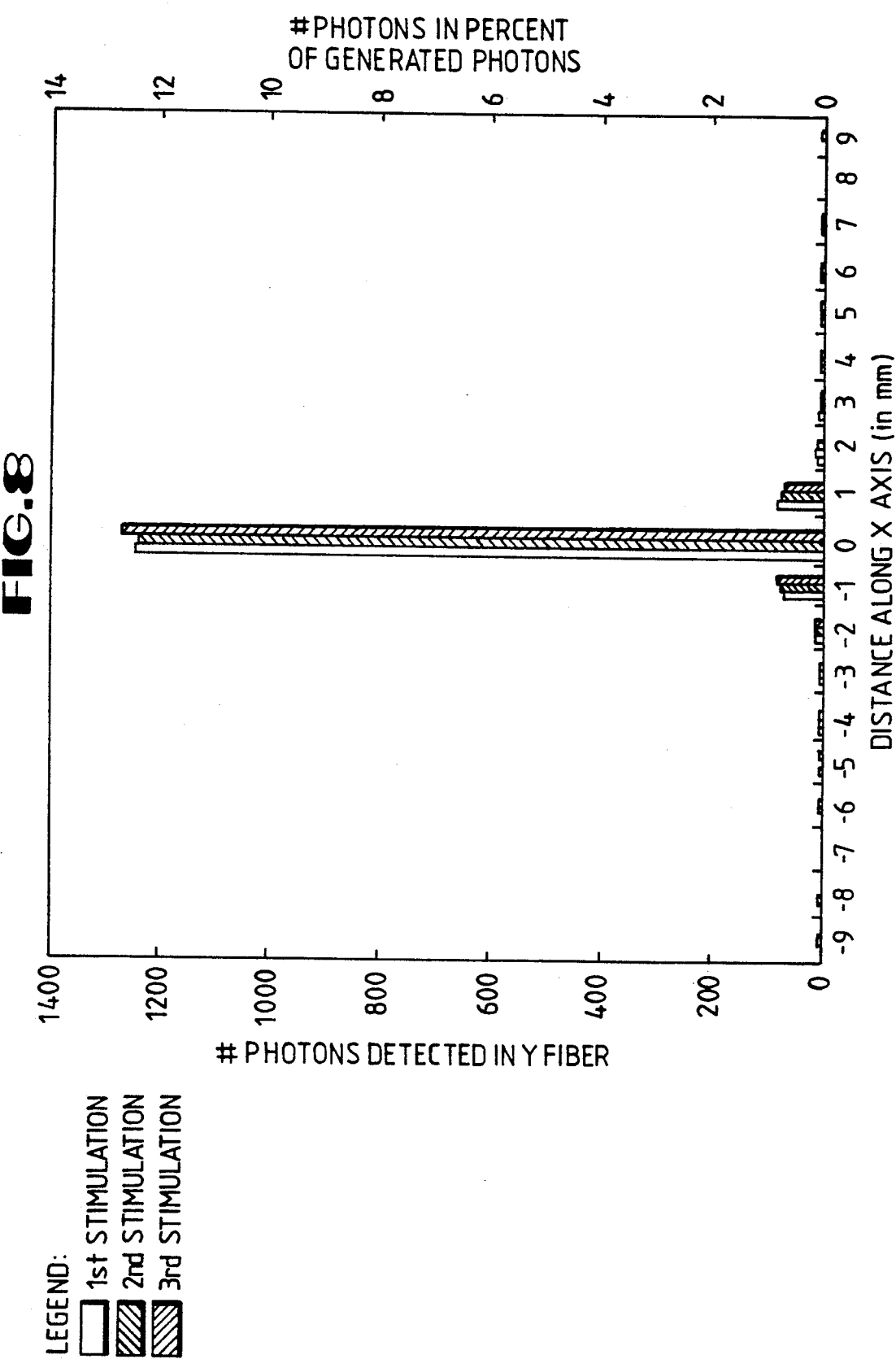

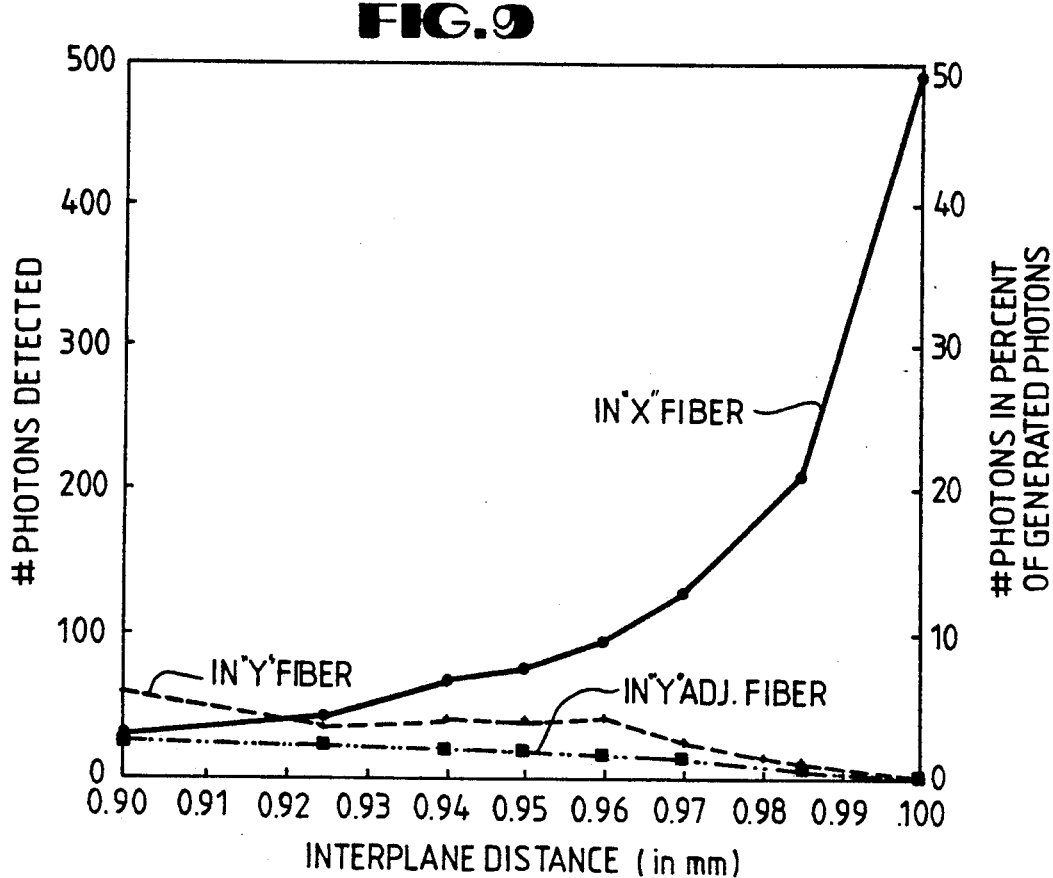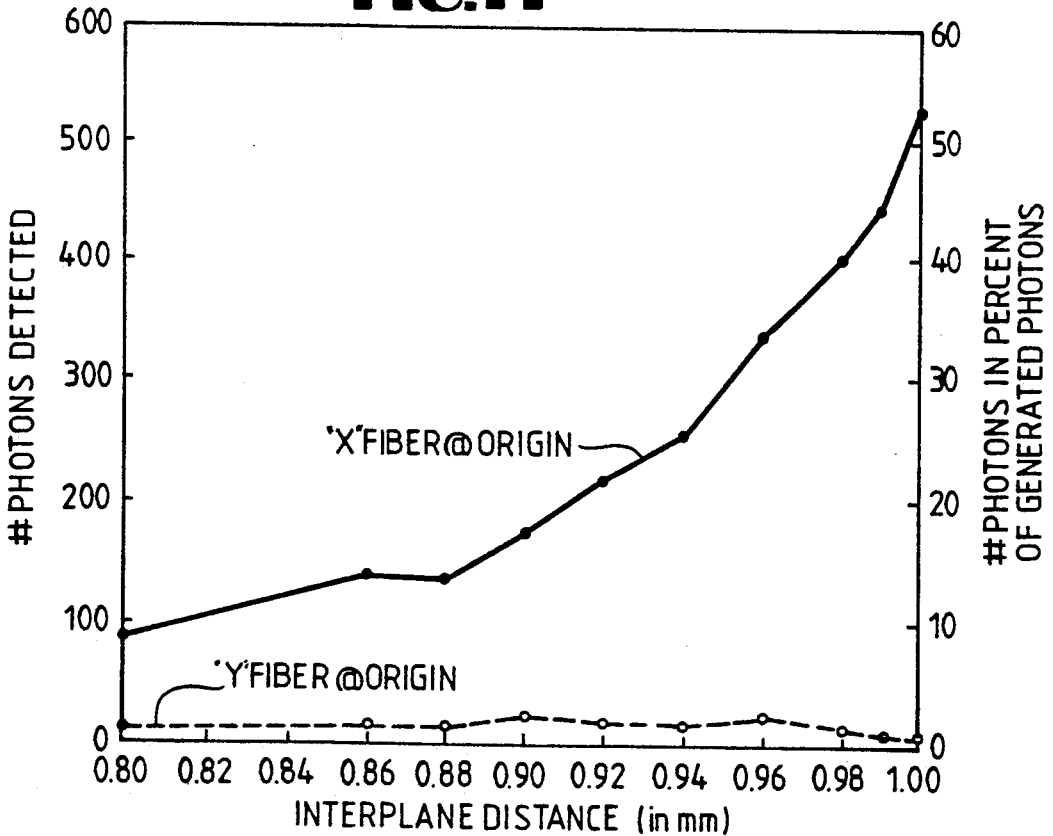

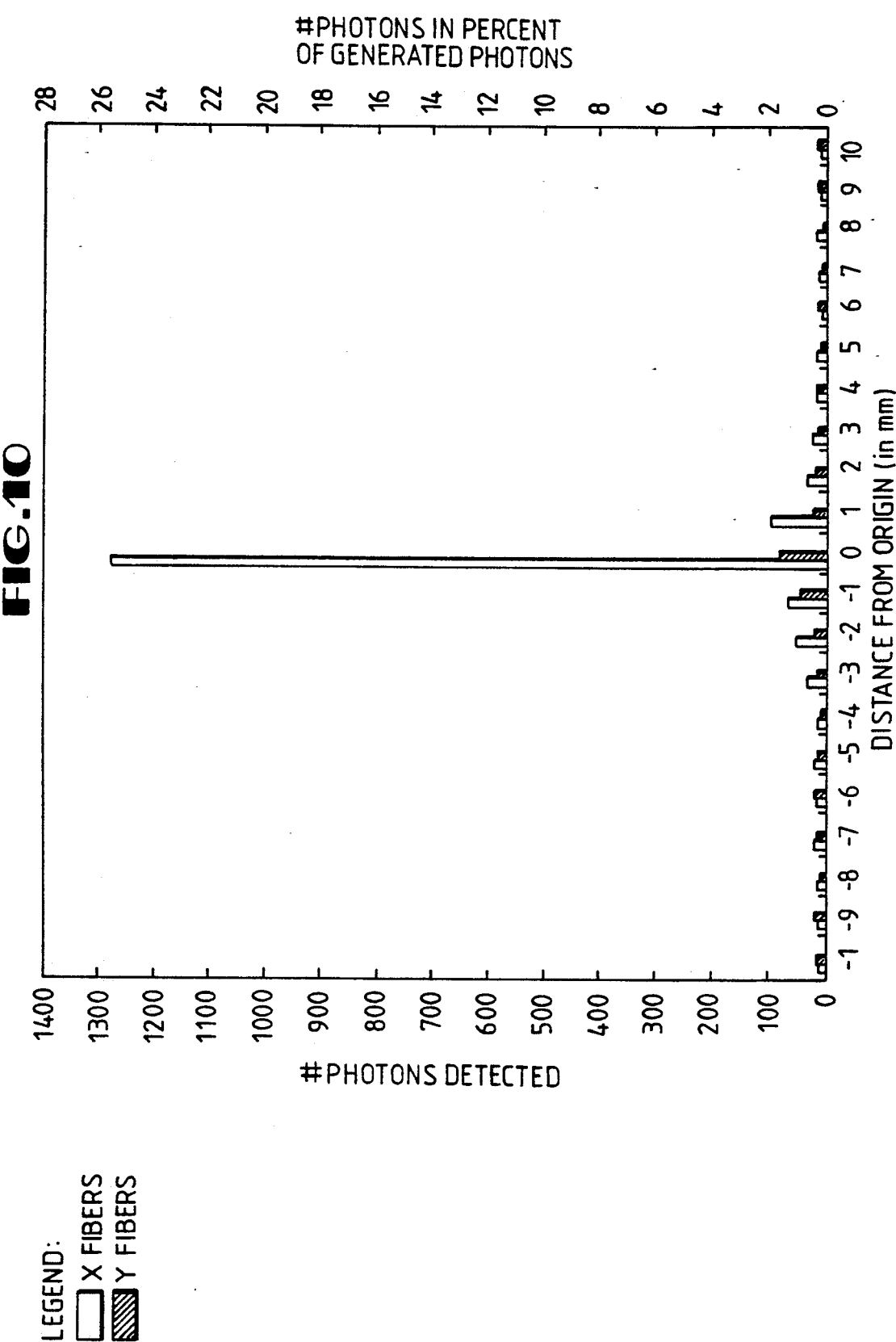

POSITION SENSITIVE GAMMA RAY DETECTOR

This application is a continuation-in-part of Ser. No. 433,617, filed on Nov. 9, 1989, now issued as U.S. Pat. No. 5,103,098.

BACKGROUND OF THE INVENTION

This invention relates to a method and apparatus for locating the origin of a gamma ray in an imaging system. In particular, this invention relates to a method and apparatus for determining the origin of a gamma ray as part of a technique of imaging internal organs in a living subject.

There are many situations in medicine where it is desirable to obtain images of a patient's internal organs or body functions. The imaging technology that is used to do this includes a variety of techniques such as magnetic resonance imaging (MRI), computerized tomography (CT), single photon emission computerized tomography (SPECT), and positron emission tomography (PET).

Generally speaking, in PET, a radionuclide is administered internally to a living subject. A positron from the decaying radionuclide encounters and annihilates with an electron, resulting in a pair of 511 keV annihilation photons which are emitted in exactly opposite (180°) directions from the annihilation site in the subject. By arranging banks of scintillation detectors all around the subject, the origin of the gamma ray can be determined. Substantially simultaneous detection of photons in opposingly situated detectors defines the site of the positron-electron annihilation as lying somewhere along a line directly between the opposing detectors. Typical PET scanners or tomographs include complex computerized data systems for collecting the information obtained and using it to reconstruct an image of the target organ, using mathematical techniques similar to those employed in computerized tomography.

The radioactive isotopes used in PET include, but are not limited to, $^{18}F$, which has a half-life of approximately 110 minutes., $^{11}C$ (half-life of approximately 20 minutes), $^{13}N$ (half-life of approximately 10 minutes), and $^{15}O$ (half-life of approximately 2 minutes). Because of the relatively short half-lives of the radioisotopes used, they are typically produced in an on-site cyclotron or other particle accelerator. Other nuclides exist which have either a long half life or a parent with long half life. These can be used without on-site cyclotrons, but they have generally less desirable chemical or physical characteristics. The practical need for an on-site cyclotron dramatically increases the cost of PET and therefore has limited the number of such systems in place.

In contrast, in SPECT, a single photon is emitted from a radionuclide at a site in the patient's body. The photon is again detected by scintillating materials, but in contrast to PET, the origin of the photon is determined by analyzing the information obtained when the single photon strikes different portions of an array of scintillating material, thereby permitting the deduction of its path. SPECT uses longer-lived isotopes than PET, including but not limited to $^{99m}Tc$ (half-life of approximately 6 hours) and $^{201}Tl$ (half-life of approximately 74 hours). However, the resolution obtainable through SPECT imaging is lower than that presently available in PET systems.

In both prior art PET and SPECT systems, the scintillating detectors are able to detect the emitted photons (also called gammas) by means of a phenomenon whereby a photon interacts with an atom of the scintillating detector, which may be in the form of a scintillating optical fiber. This interaction results in the ejection of a so-called photoelectron or Compton electron. The ejected electron ionizes the fiber, thus losing its energy and causing the emission of light quanta. The light propagates toward an end of the fiber, where it is detected by means such as photomultipliers. The ejected electron, meanwhile, will sometimes have sufficient energy to move on and interact with at least one more scintillating fiber in an array of alternating x-y planes of orthogonal fibers, again resulting in the generation of light in those fibers. By detecting the light generated in the two or more fibers, and then determining the point at which those fibers intersect, one can determine the site of the event.

It is crucial for electronically collimated SPECT imaging that the path of the incoming gamma ray be determined. This is possible by detecting two (Compton) events within the same detector or two different detectors; the line through the two points at which the fibers intersect determines the direction of the incoming gamma ray.

Presently, both PET and SPECT systems have less than optimal resolution and efficiency of detection of gamma rays. Two factors that reduce the efficiency of these systems are: (1) gammas (photons) which pass through the scintillating fiber array without generating a photoelectric or Compton event, and (2) events which go undetected due to the requirement that the electron traverse at least two layers of fibers in the z direction in order for detection to be accomplished. This poses a particular problem in SPECT systems at low energy. A fiber of, for example, 0.25 mm diameter will stop an electron of kinetic energy 150 keV; a fiber of 0.05 mm diameter stops electrons of 50 keV. Thus, Compton interactions of a few hundred keV gamma rays most frequently excite only one fiber in prior art radiation detecting systems. In such a situation, the position of the origin of the gamma ray is not detectable without using extremely fine fibers, which are both inherently inefficient and expensive.

There is a need for improved imaging methods and apparatus that would eliminate or reduce the shortcomings of the prior art, not only in PET and SPECT, but also in other imaging technologies.

SUMMARY OF THE INVENTION

The present invention relates to apparatus for detecting and locating the origin of a gamma ray, which may be used in a medical diagnostic imaging system, or in imaging systems for other applications. Such apparatus can include at least one primary fiber which is a scintillating fiber and is positioned to receive radiation from a gamma ray source, at least one secondary fiber which intersects the primary fiber at a non-zero angle and is in optical contact with the primary fiber, means for detecting light which are coupled to the primary fiber and the secondary fiber, and means for collecting and processing data from the means for detecting light, to locate the origin of the gamma ray. The apparatus preferably includes a plurality of primary fibers and a plurality of secondary fibers, with the primary fibers being arranged substantially parallel to each other in a first plane. Likewise, it is preferred that the secondary fibers be arranged substantially parallel to each other in a second plane which is parallel and adjacent to the first plane. In an especially preferred embodiment, the primary fibers are orthogonal to the secondary fibers. Furthermore, in a preferred embodiment, the two sets of fibers can both act as either a primary or a secondary fiber depending on the site at which the gamma ray initially interacts.

The present invention also relates to a method for detecting and locating the origin of a gamma ray in a patient as part of a medical diagnostic imaging system. Such a method includes the steps of (1) emitting a gamma ray from a gamma ray source in a patient's body; (2) ejecting an electron in a primary fiber which is a scintillating fiber as a result of an interaction between the gamma ray and the scintillating fiber, thereby causing the emission of visible light quanta in the primary fiber; (3) transferring a portion of the light quanta from the primary fiber to a secondary fiber which intersects the primary fiber at a non-zero angle and is in optical contact with the primary fiber; (4) detecting the light quanta from the primary fiber in the secondary fiber; and (5) determining the location of the interaction between the gamma ray and the primary fiber by identifying the location of the optical contact between the primary fiber and the secondary fiber. For electronically collimated SPECT, steps 2-5 must be repeated at least once.

In the present invention, an electron provided by a gamma ray interaction need only generate light in a single fiber, in contrast to the requirement of prior art systems that such an electron produce light in at least two fibers. A fraction of the light quanta which are generated by the electron travel to the two ends of the first fiber, and are detected there by photomultipliers. The remaining fraction, or a portion thereof, travels to an adjacent, preferably orthogonal fiber which is in optical contact with the first fiber, and then travels to the two ends of that second fiber, where the light is again detected by photomultipliers. The substantially simultaneous signals produced by the photomultipliers for the two fibers, plus the known point of intersection (optical contact) of the two fibers, identifies the site where the gamma ray struck the fibers, and thus permits determination of the location of the source of the gamma ray. This scheme is referred to as "conference sensing."

It should be noted that the accidental spill-over (cross-talk) of the light field from one fiber to adjacent ones is an unwanted effect in general. Conference sensing refers to the enhanced and controlled transfer of light from one fiber to a second one crossing it, and to the suppression of the "cross-talk."

The present invention can be used in a variety of digital imaging applications such as computer tomography, positron emission tomography, single photon emission computed tomography, fluoroscopy, and X-ray digital imaging.

The present invention permits the use of larger fibers than are suitable in prior art detection systems for the energies used in nuclear medicine. A system with such larger fibers has several advantages over prior art systems, including: (1) greater efficiency in light quanta generation (as the electron loses all its energy in a single fiber and, thus, produces more light quanta), (2) greater transmission to the photomultipliers (as the larger fibers transmit light to a greater extent), (3) a higher light signal at the photomultiplier, resulting in (4) higher detector sensitivity, and (5) better energy resolution, even at relatively low energies. These in turn imply (6) higher efficiency, (7) more accurate determination of the direction of the original gamma ray, as the accuracy is dependent both upon the energy transferred to the electron and the energy resolution, and (8) a significant reduction (by a factor of $\approx 35$) in the complexity of the electronics and associated detector costs.

BRIEF DESCRIPTION OF THE DRAWINGS

FIG. 8 is a graph of a simulation showing the number of counts detected in different parallel fibers in a single (Y) plane when Compton events occur in a single orthogonal fiber in an adjacent, parallel (X) plane.

FIG. 9 is a graph of a simulation showing the effect of the distance between the centers of the X and Y planes on the number of photons detected.

FIG. 10 is a graph of a simulation showing the number of counts detected in different parallel fibers in a single (Y) plane when Compton events occur in a single orthogonal fiber in an adjacent, parallel (X) plane which comprises a plurality of parallel fibers in addition to the one fiber in which the Compton events occur.

FIG. 11 is a graph of a simulation showing the effect of the distance between the centers of the X and Y planes on the number of photons detected. This graph differs from FIG. 9 in that, in this case, both the X and Y planes include a plurality of parallel fibers.

DETAILED DESCRIPTION OF SPECIFIC EMBODIMENTS

Figure 1:
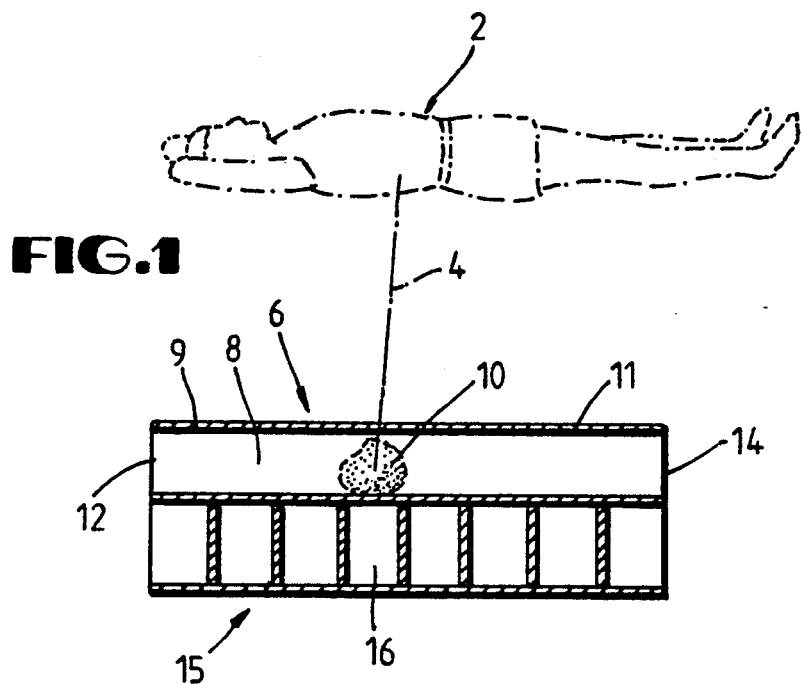
FIG. 1 shows the basic principle employed in the present invention, and depicts a cross-section of a two-layer array of fibers, with the upper layer running parallel to the surface of the drawing, and the lower layer running perpendicular to the surface of the drawing.

The present invention makes use of controlled transfer of light between optical fibers to determine the location of a gamma ray interaction. FIG. 1 illustrates the basic mechanism.

A photon produced by the decay of a radioisotope in the body 2 travels along a path 4 toward a detection apparatus 6, which includes a first scintillating fiber 8. The fiber 8 has a core 9 and cladding 11. The photon interacts with an atom of the scintillating fiber core 9 at a point 10, ejecting an electron. The electron ionizes the fiber 8, thus losing its energy to the fiber. One result of this loss of energy is the emission of visible light; the number of quanta of light produced is proportional to the energy deposited by the electron along its path. The visible light quanta propagate along the fiber 8 towards its two ends 12 and 14, where they are detected by photomultipliers (not shown in FIG. 1) at the ends of the fiber. Any event in which a sufficient number of quanta are detected activates the electronic equipment for analyzing and recording the event (not shown in FIG. 1).

Beneath the first scintillating fiber 8 is an orthogonal array of optical fibers 15. This array of secondary fibers 15 may or may not be scintillating. By removing a portion of the cladding of the first fiber 8 and the secondary fibers 15, and by placing an optical coupling agent between them, the first fiber and secondary fibers are placed in optical contact. In an alternative embodiment, an optical coupling agent could be used without removing the cladding from the fibers.

Some of the quanta of visible light generated in the first scintillating fiber 8, instead of travelling to the two ends 12 and 14 of that fiber, are caused to pass from the first fiber 8 into at least one secondary fiber 16, which is in optical contact with the first fiber 8, and which is part of the array of secondary fibers 15, and which intersects with the first fiber 8 at or near the site of the gamma ray event.

The quanta of light transferred to the second fiber 16 travel in both directions toward the two ends of the second fiber, where photomultipliers (not shown in FIG. 1) detect them in the same way as at the ends of the first fiber.

The near-simultaneous detection of light in the first fiber 8 and the secondary fiber 16, and the knowledge of the point of intersection and optical contact of those two fibers, permits the determination of the site of the Compton event, and thus the deduction of the origin of the gamma ray, using either mechanical or electric collimation. In the first case, a set of collimators separates the patient from the fibers; in the second, at least two interactions are detected in coincidence and the direction is computed.

Figure 2:
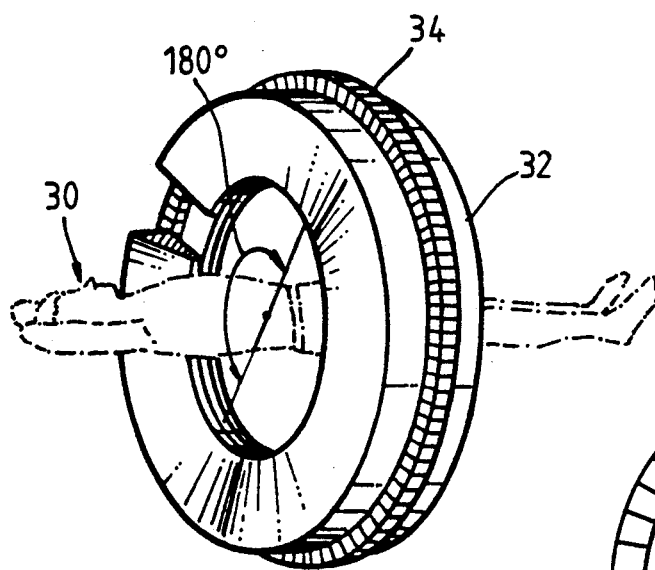
FIG. 2 shows a patient positioned in an imaging apparatus which can incorporate the present invention.

FIG. 2 shows an example of apparatus in accordance with the present invention. A patient 30 is positioned in a support ring 32. An appropriate radioisotope is administered to the patient 32. Stacks of scintillating fibers 34 can be positioned about the patient on the support ring 32.

Figure 3:
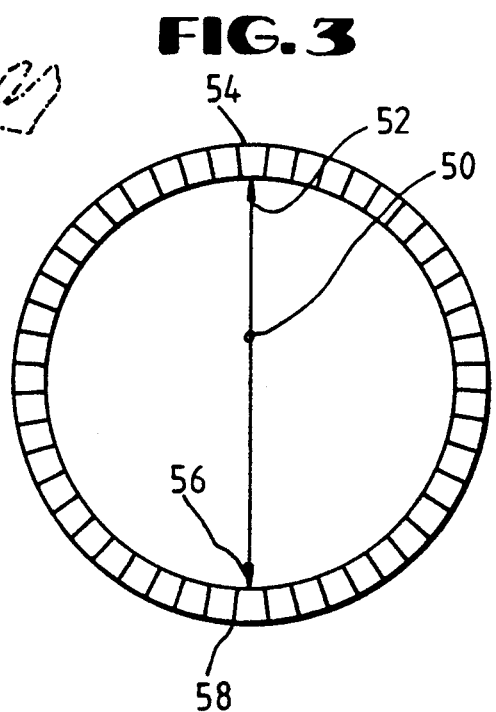
FIG. 3 shows a cross-sectional representation of a PET detector apparatus which can incorporate the present invention.

In a PET application, the radionuclide in the patient's body emits a positron which, after travelling a short distance from the nucleus, interacts with an electron. The resulting annihilation yields two photons having energy of 511 keV, and which move in exactly opposite directions. FIG. 3 illustrates the spatial origin 50 of the gamma ray, i.e., the position of the pair annihilation. One photon 52 strikes a part of the scintillating fiber stack 54 and the other photon 56 strikes the opposite portion 58 of the scintillating fiber stack. By determining the two points where the photons strike at substantially the same time, knowing the time of flight of the photons, and knowing the time difference between the striking of the fiber stacks by the photons, the origination position of the photons can be calculated.

Suitable scintillating optical fibers can have diameters ranging from 0.01 mm to 5 mm. Suitable materials for such fibers include polystyrene doped with butyl-PBD (phenyl-biphenyloxadiazole) and POPOP (di-phenyloxazolyl-benzene), preferably clad in PMMA (polymethylmethacrylate; 25 μm thickness), producing 420 nm wavelength photons. Suitable fibers are available from Optectron (France), Bicron Corporation (Newburgh Heights, Ohio), Mitsui Plastics, and Kuraray/Kyowa (Japan).

The optical fibers may be circular in cross-section, or they may have other shapes (i.e., square). Circular fibers are often preferred when long fiber lengths (30–100 cm) are used because they are more efficient in transmitting light quanta from the site of interaction to the photomultipliers at their end. The optical fibers used in position sensitive detectors are typically at least 20 cm long. Square fibers are preferred in a compact detector design because they fill the detector volume more fully and optical contact can be more readily achieved between two fibers at right angles.

Figure 4:
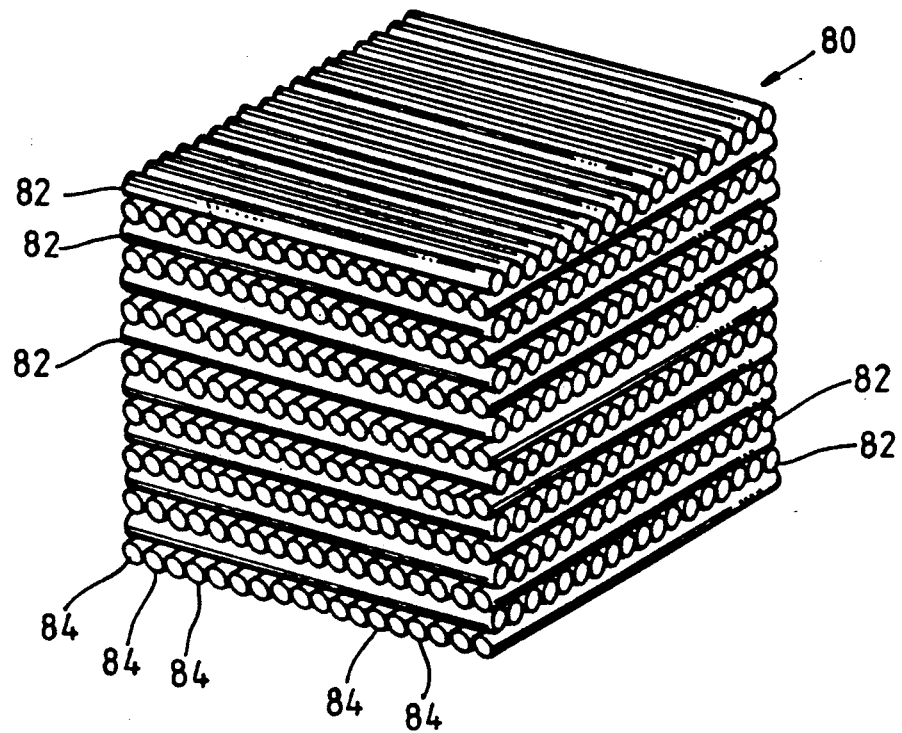
FIG. 4 shows a multi-layer array of detector fibers in accordance with the present invention.

The fibers are preferably arranged in a multi-layer array 80 as shown in FIG. 4. The array 80 is composed of parallel alternating layers 82, each of which is composed of a plurality of optical fibers 84. Alternate layers have different orientations in the X-Y plane, and preferably form an angle between 60–90°. Most preferably they are orthogonal.

At intersection points in the array 80, an optical fiber in one layer contacts a optical fiber from another, adjacent layer at a non-zero angle. An optical connection is formed at each of the intersection points. This can be done by various methods.

In the preferred mode, when using round fibers, the optical connection is formed by machining a plurality of notches in a first fiber, such that a plurality of fibers in an adjacent layer will fit into the notches in the first fiber. As a result of the notches, the fibers in the adjacent layer penetrate into the first fiber. The machining of the notch also removes any protective paint or cladding on the first, scintillating fiber. If the second fiber does not have a notch machined in it, the protective paint or cladding must be removed from it at the intersection point to complete the optical contact. Alternatively, the fibers in the adjacent layer could have a protrusion formed at the intersection points that would fit into the notches of the first optical fiber.

In another embodiment using square fibers, the protective paint merely is stripped off one side of the fibers in adjacent layers at their intersection points. An optical cement is used to optically connect the two fibers at intersection points. The optical cement preferably has a refractive index that is the same as the two optical fibers. Suitable optical cements include Bicron BC-600.

The layers of fibers may be all identical, or may be alternating layers of scintillating and non-scintillating optical fibers. The scintillating layer is the layer that reacts with the gamma ray, while the non-scintillating layer is the layer that "conferences" with (receives light from) the reacting layer.

Figure 5:
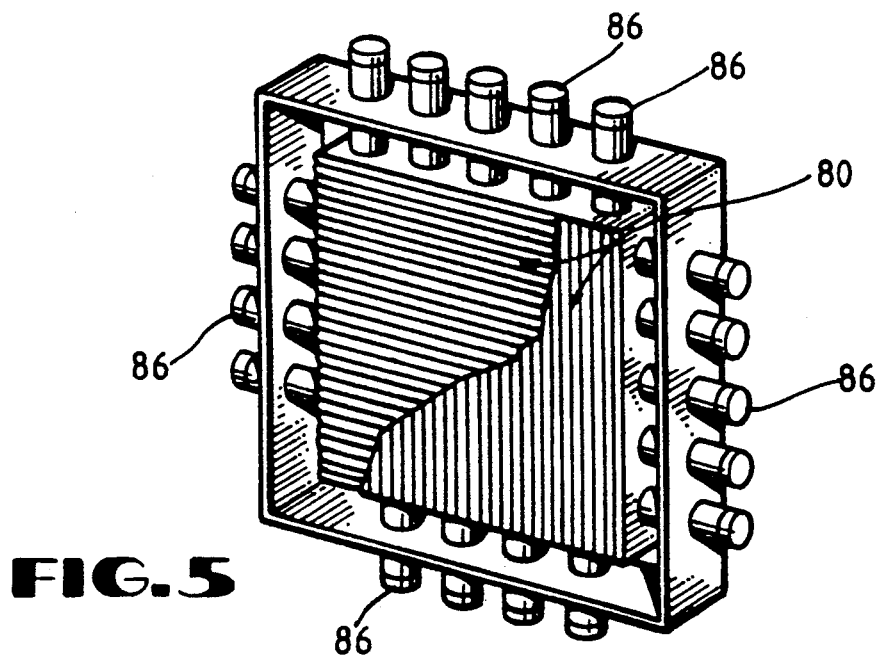
FIG. 5 shows a multi-layer array of detector fibers, coupled to a plurality of photomultipliers, in accordance with the present invention.
Figure 6A:
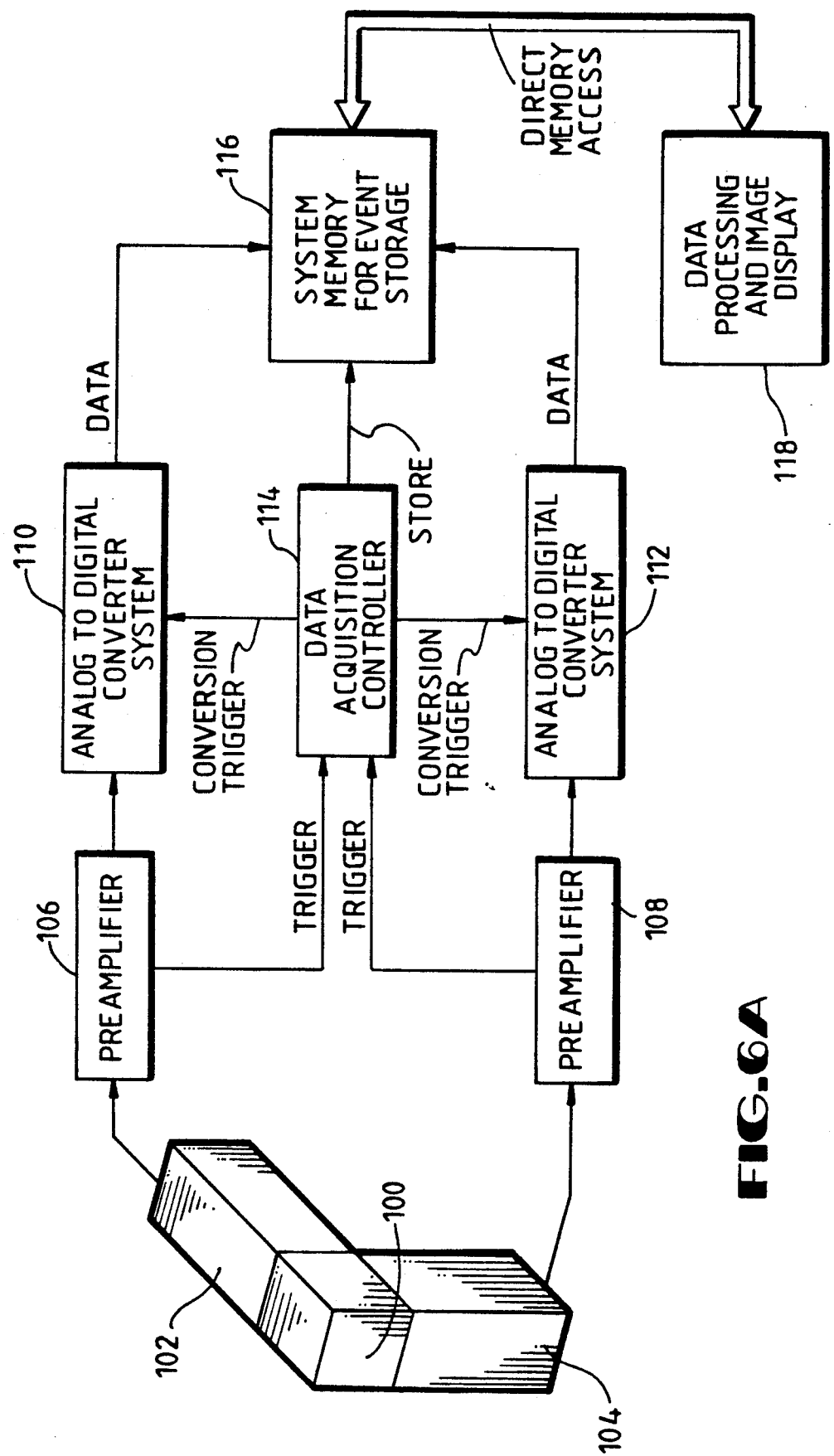
FIG. 6A shows apparatus in accordance with the present invention in block diagram form.

FIG. 5 shows an array 80 of fibers, coupled to photomultipliers 86. FIG. 6A shows the entire apparatus, including electronics, in block diagram form. A fiber detector array 100 is connected to position sensitive photomultipliers 102 and 104, which are, in turn, connected to preamplifiers 106 and 108. The outputs of the preamplifiers are connected to A/D converter systems 110 and 112. The preamplifiers 106 and 108 also trigger a data acquisition controller 114, which in turn triggers the A/D conversion in systems 110 and 112. The A/D converter systems and the data acquisition controller 114 are connected to a system memory 116 for event storage. Data processing and image display apparatus 118, such as a personal computer, can directly access the system memory 116.

Suitable photomultipliers are Hamamatsu R 2486 position sensitive photomultipliers. Waveshifters can be used to prevent photons that are crossing over from a first optical fiber to a second optical fiber from crossing back over into the first optical fiber.

Figure 6B:
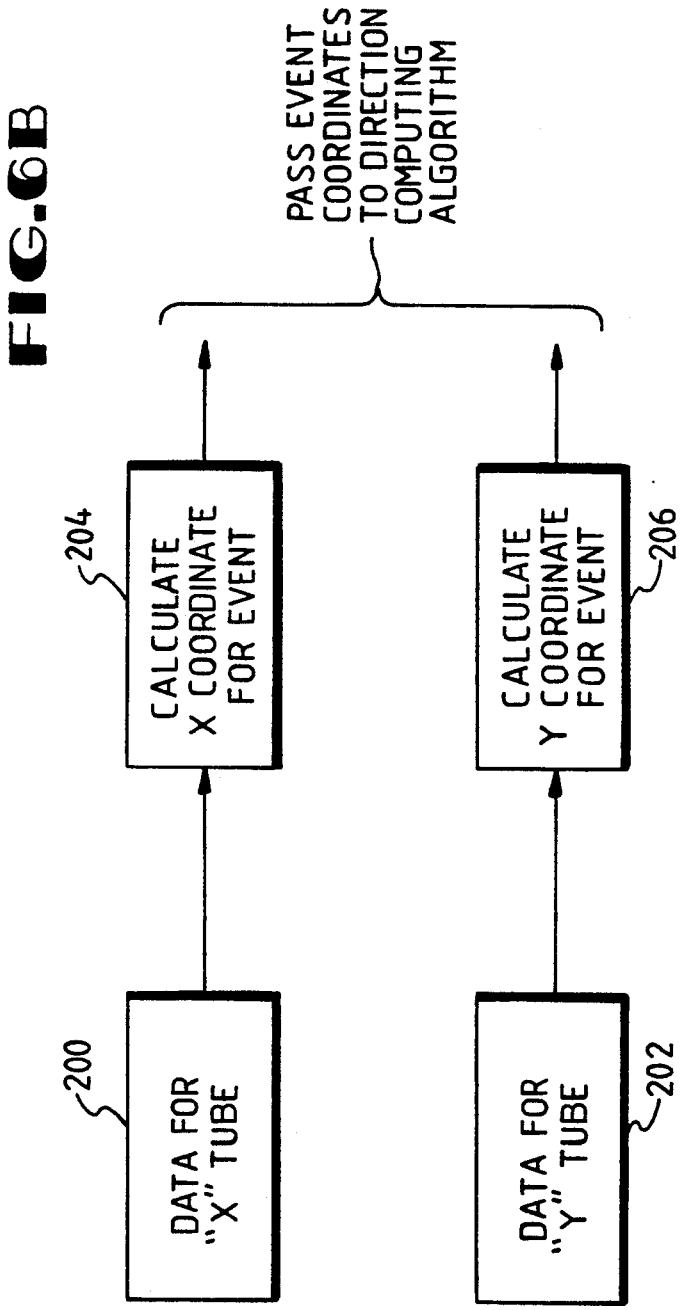
FIG. 6B shows in block diagram form the software which can be used with the apparatus of FIG. 6A.

FIG. 6B shows a block diagram of software that can be used with the apparatus of FIG. 6A. In the nomenclature of FIG. 6B, the "x tube" indicates a photomultiplier tube connected to fibers oriented in the x direction, and the "y tube" indicates the photomultiplier tube connected to fibers oriented in the y direction. Data for the x tube 200 and data for the y tube 202 are used in calculating the x and y coordinates, respectively, for the event (204, 206). The x and y event coordinates are then used in a direction computing algorithm to determine the site of the event and, subsequently, to store and/or display that information.

The preferred conditions for conference sensing include that the fibers in one plane should not transmit quanta of light to other fibers in the same plane. Such intraplanar transmission of light would create unwanted noise. Further, it is desirable that, for a given point on a fiber in one layer, an event at that point should result in transfer of light to a small number of fibers in the adjacent plane, most preferably to a single fiber in the adjacent plane.

The ratio of (a) photons passed to the second fiber to (b) the photons remaining in the original fiber can be manipulated by changing the interpenetration of the fibers (i.e., the interplane distance, or, stated another way, the distance between the fiber centers in consecutive planes). However, changing the angle between the fibers does not increase efficiency and does tend to decrease resolution. Accordingly, the fibers in one plane are preferably at approximately 90° angles to the fibers in the adjacent planes.

As the number of fibers increases, uncontrolled crosstalk increases, and the signal to noise ratio worsens. Preferably no more than about 100–200, and most preferably about 20–100 fibers are present in a single plane. Using 3 mm diameter fibers, a detector having an overall size of $10 \times 10 \times 5$ cm could be constructed with only 578 fibers, in 17 layers of 34 fibers each. In contrast, 20,000 fibers may be needed in prior art detecting systems when 0.5 mm diameter fibers are employed. It is expected that a 3 mm fiber size would result in a 1.5 mm resolution at the object imaged, as this lies approximately halfway between the detectors. Thus, the object resolution coincides with the intrinsic positron "smearing" range of >1 mm. (Note that prior art systems use ≈4–7 mm resolution.)

EXAMPLE 1

A simplified experiment was conducted using two round fibers (1 mm diameter, Bicron BCF-10) which were placed in optical contact with each other with optical gel (Dow Corning Q2-3067 or equivalent) coupling. Only one of the fibers was a scintillating fiber; the other was nonscintillating. A highly collimated, very low energy gamma ray source was used ($^{125}$I; <25 keV). No attempt was made to detect coincidence between events in the two fibers; instead only the pure number of counts in each fiber was recorded. Table 1 shows the counts detected by the photomultipliers.

TABLE 1

Counts Measured in Two-Fiber Apparatus

| period | counts in scintillating fiber | counts in nonscintillating, adjacent fiber |
|---|---|---|
| 1 | 5649 | 300 |
| 2 | 5776 | 266 |
| 3 | 5593 | 257 |
| 4 | 5549 | 263 |
| 5 | 5616 | 296 |
| 6 | 5503 | 265 |
| 7 | 5556 | 250 |
| 8 | 5786 | 294 |
| 9 | 5622 | 238 |
| 10 | 5568 | 259 |
| 11 | 5482 | 235 |
| 12 | 5750 | 229 |
| 13 | 5688 | 284 |
| 14 | 5768 | 384 |
| 15 | 5360 | 257 |
| 16 | 5557 | 273 |
| 17 | 5561 | 266 |
| 18 | 214 | 164 |
| 19 | 127 | 138 |
| 20 | 124 | 116 |

Each period in Table 1 represents an elapsed time of 400 seconds. After period 17, the radioactive source was removed. The counts detected in the two fibers can be summarized as follows:

TABLE 2

Counts in Scintillating Fiber

| | Source present | Source not present | Delta |
|---|---|---|---|
| avg. | 5610.82 | 155.00 | 5455.8 |
| std. dev. | 112.49 | 41.74 | |
| counts/sec. | 14.027 | 0.388 | |
| count error/sec. | 0.187 | 0.031 | |

TABLE 3

Counts in Nonscintillating Fiber

| | Source present | Source not present | Delta |
|---|---|---|---|
| avg. | 271.53 | 139.33 | 132.2 |
| std. | 34.48 | 19.62 | |
| counts/sec. | 0.679 | 0.348 | |
| count error/sec. | 0.041 | 0.030 | |

Because the Compton electron which was generated in the scintillating fiber could not produce visible light in the nonscintillating fiber, any light observed in the latter must have originated in the former, or in the optical gel used to put them in optical contact. There was a high background count rate (due to electronics noise and background radiation) and the efficiency of counting in the second (nonscintillating) fiber was <3% after correction for the background. This 3% was the result of crosstalk in which light was transmitted between the two fibers. It is worth noting that the detection efficiency and the intensity of the emitted light in this example were lower than what would occur in an actual imaging use of the present invention.

EXAMPLE 2

Two scintillating fibers (Bicron BCF-10) with a square cross-section (1 mm on a side) were machined, removing the cladding on one side of each fiber and thus exposing their scintillating cores, so that when the two were placed in parallel contact with each other, they in effect formed a continuous body of scintillating material. When exposed to an uncollimated $^{131}$Cs source (1 μCi; emitted isotopically single gamma rays of energy 663 keV), about 22% of the counts reflected coincidence (i.e., events which were detected essentially simultaneously in the first and the second fibers). Table 4 shows the number of coincidences, as compared to the total number of counts detected in the first fiber. Each period in the table represents an increment of 300 seconds. After period 17, optical contact between the two fibers was eliminated by flipping them so that their sides which were still covered by cladding were in contact.

TABLE 4

Comparison of Total Counts to Coincidences With and Without Optical Contact

| Period | No. coincidences | No. counts in Fiber A |
|---|---|---|
| 1 | 1389 | 6704 |
| 2 | 1349 | 6415 |
| 3 | 1367 | 6496 |
| 4 | 1385 | 6424 |
| 5 | 1410 | 6373 |
| 6 | 1384 | 6222 |
| 7 | 1412 | 6311 |
| 8 | 1349 | 6385 |
| 9 | 1387 | 6277 |
| 10 | 1382 | 6292 |
| 11 | 1378 | 6242 |
| 12 | 1391 | 6144 |
| 13 | 1360 | 6158 |
| 14 | 1332 | 6091 |
| 15 | 1388 | 6171 |
| 16 | 1347 | 6187 |
| 17 | 1332 | 6077 |
| 18 | 104 | 5396 |
| 19 | 89 | 4963 |
| 20 | 79 | 5035 |
| 21 | 91 | 4964 |
| 22 | 98 | 4800 |
| 23 | 98 | 4964 |
| 24 | 95 | 4880 |
| 25 | 94 | 4923 |
| 26 | 103 | 4929 |
| 27 | 105 | 4857 |
| 28 | 85 | 4855 |
| 29 | 84 | 5028 |
| 30 | 80 | 4967 |
| 31 | 102 | 4799 |
| 32 | 93 | 4885 |
| 33 | 96 | 4968 |
| 34 | 90 | 4822 |
| 35 | 120 | 4904 |
| 36 | 90 | 4825 |
| 37 | 111 | 4894 |
| 38 | 98 | 4918 |
| 39 | 98 | 4780 |

The data can be summarized as follows:

TABLE 5

Coincidences and Counts With and Without Optical Contact

| Average | With optical contact | Without optical contact |
|---|---|---|
| no. coincidences/sec. | 4.58 | 20.97 |
| no. counts/sec. | 0.32 | 16.42 |

The ratio of coincidences when there was optical contact as opposed to when there was no optical contact was 14.3:1. Thus, the conference sensing scheme was more than 10 times more efficient than the scheme requiring a single electron to cross two fibers. Note that this experiment was done with an uncollimated source, whose exact position could not be determined with precision. Therefore the fibers were kept parallel to determine the efficiency of the scheme.

EXAMPLE 3

Figure 7:
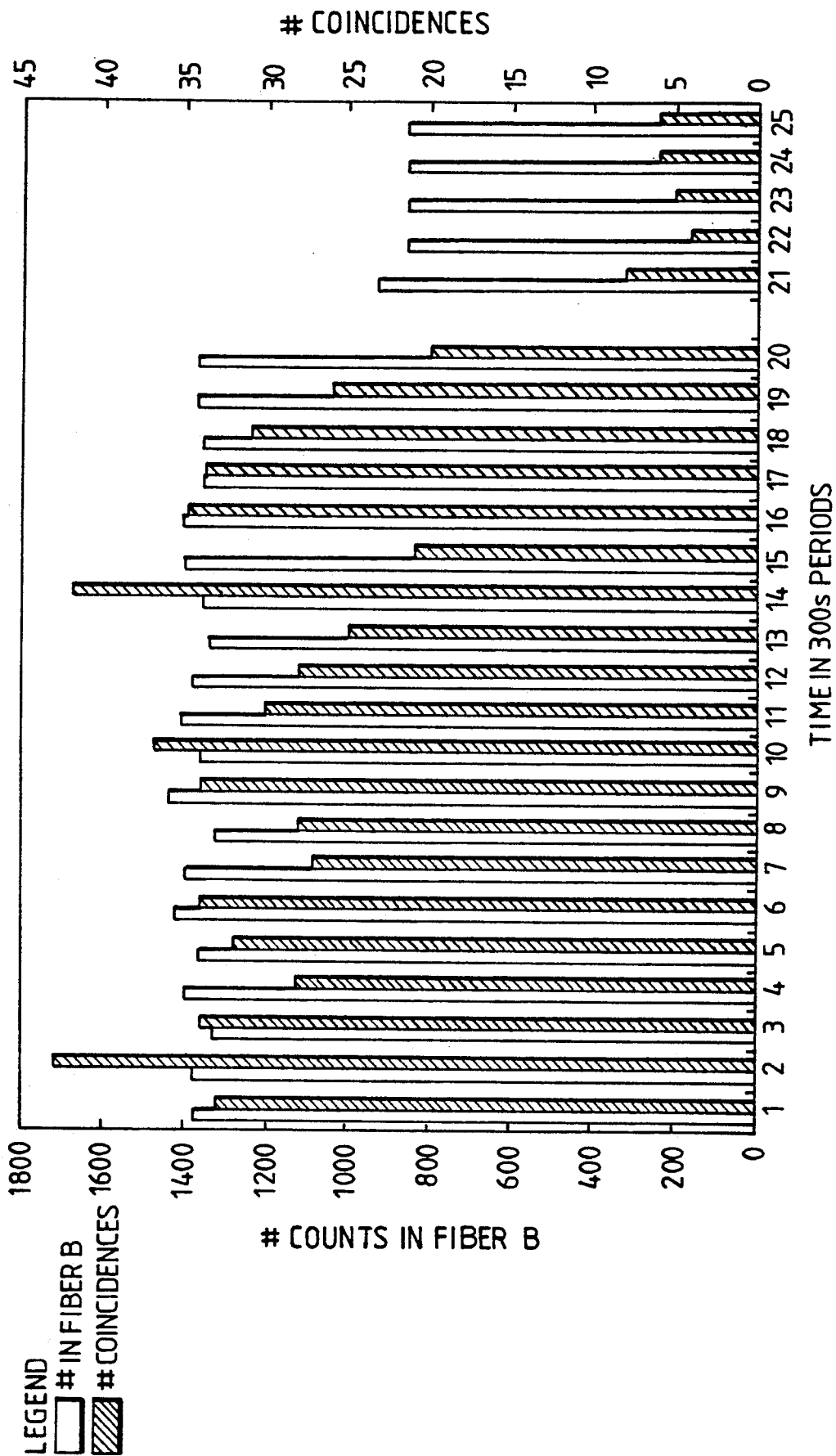
FIG. 7 is a graph showing the number of counts detected in two fibers when optical contact existed between the fibers and then after optical contact was eliminated.

In this experiment, two orthogonal fibers (Bicron BCF-10) having a square cross-section and a diameter of 1 mm were tested with and without optical contact. The source was $^{137}$Cs (1 fCi). All pulses from the photomultiplier tubes with amplitudes exceeding 1.57 mV (tube A) and 1.54 mV (tube B) were counted. Counts were measured in 300 second periods. FIG. 7 shows the number of counts detected in the lower fiber (fiber B) and the number of coincidences. After period 20, the orientation of the fibers was changed so that they were no longer in optical contact, but were still orthogonal. The average number of counts per second in fiber B was 4.602 when optical contact existed and 2.913 after optical contact was eliminated. The number of coincidences per second was 0.104 with optical contact and 0.019 without.

TABLE 6

Counts and Coincidences in Fiber B With and Without Optical Contact

| Period | No. counts in fiber B | No. coincidences |
|---|---|---|
| 1 | 1377 | 33 |
| 2 | 1380 | 43 |
| 3 | 1328 | 34 |
| 4 | 1396 | 28 |
| 5 | 1372 | 32 |
| 6 | 1426 | 34 |
| 7 | 1403 | 27 |
| 8 | 1325 | 28 |
| 9 | 1445 | 34 |
| 10 | 1366 | 37 |
| 11 | 1412 | 30 |
| 12 | 1384 | 28 |
| 13 | 1345 | 25 |
| 14 | 1362 | 42 |
| 15 | 1407 | 21 |
| 16 | 1412 | 35 |
| 17 | 1364 | 34 |
| 18 | 1361 | 31 |
| 19 | 1373 | 26 |
| 20 | 1374 | 20 |
| 21 | 935 | 8 |
| 22 | 860 | 4 |
| 23 | 856 | 5 |
| 24 | 855 | 6 |
| 25 | 863 | 6 |

The ratio of coincidences to counts in fiber B was 2%, reflecting the fact that the radiation from the source activated a large volume of fiber B, but that only a small proportion of that volume was in contact with fiber A. In addition, there was an asymmetry between the two fibers, with fiber A being more efficient (e.g., giving a reading of 2175 vs. 1379 counts in a 300 second period) because of imperfect fiber-photomultiplier contact. The coincidences were affected not only by the quality of the contact but also by the background radiation, so that the factor obtained above without corrections is an underestimate of the true enhancement provided by conference sensing.

EXAMPLE 4

Additional experiments were conducted to determine the number of false coincidences caused by background radiation. A $^{137}$Cs source ($10^{-6}$ Ci) was used with 1 mm square fibers (Bicron BCF-10). Counts and coincidences were measured in 900 second periods. All pulses from the photomultiplier tubes with amplitudes exceeding 1.55 mV were counted.

TABLE 7

|  | No. coincidences/sec. | No. counts/sec. in fiber B |
|---|---|---|
| Avg. | 0.0183 | 2.7561 |
| Std. dev. | 0.0047 | 0.0606 |
| Std. error | 0.0007 | 0.0096 |

The background can produce up to 2% false coincidence rate, with the slow electronics that were used in this experiment, the amount depending on threshold levels and other technical parameters. These parameters should be adjusted to obtain the best signal to noise ratio, as may be verified by comparing counts with (containing signal plus noise) and without (noise only) a radioactive source present. With a photomultiplier bias voltage of 1000 V, the appropriate threshold for pulses measured at the photomultiplier output was about 1.5 mV. If the angle between fibers is varied from 90° to 30°, the efficiency of coincidence counting (the ratio of coincidences to single fiber counts) changes but so does the accuracy on the position determination, indicating that the angle between fibers should preferably be between 60° and 90°, most preferably 90°.

An experiment with a $^{99m}$Tc source (the most widely used radionuclide in SPECT; radioactive nuclei were in suspension in a vial; decay gamma energy was 140 keV) showed that the coincidence rate decays as a function of time in parallel to the count rate in the exposed fiber as expected.

An experiment was also performed to compare the number of coincidences generated by different radioisotopes. Square fibers (Bicron BCF-10) with 1 mm cross section arranged at a 90° angle to each other were used, and counts and coincidences were measured at 300 second periods. All pulses from the photomultipliers with an amplitude exceeding 1.5 mV were counted.

TABLE 7

Number of Coincidences With Different Isotopes

| Isotope | Optical contact; No. counts in fiber A/no. coincidences | No optical contact; No. counts in fiber A/no. coincidences |
|---|---|---|
| $^{137}$Cs, 1μ Ci | 1988/15.8 | 1988/6.6 |
| $^{125}$I, 30 mCi | 16512/108 | 17196/2.8 |
| $^{99m}$Tc, 3.1 mCi | 8417/47.3 | 7844/5.6 |

EXAMPLE 7

A Monte Carlo computer simulation program was used to evaluate the efficiency of photon transfer between a simplified system of two orthogonal fibers in optical contact. The computer model was based on geometric optics and used the following assumptions: scattering-free, absorption-free media; at the junction between the two orthogonal fibers, the photons freely pass from one fiber to the other (no interaction intervenes); both circular fibers have the same diameter and refractive index (no cladding allowed); photons are randomly generated within a preselected cross-section of the fiber, and their orientation is randomly selected from an isotropic distribution; and the generated photon is traced until it reaches the next interface, where, depending on the refractive index and the angle of incidence, a total internal reflection or a refraction through the surface into the adjacent medium may take place (if a reflection occurs, the reflection angle is equal to the incidence angle; if a reflection does not occur, the photon is assumed to follow Snell's law of refraction).

Two configurations were modeled. In the first, the two fibers (each having diameter of 1 mm) did not interpenetrate and had one unique point. In the second configuration, the fibers did interpenetrate to the extent of 0.2 mm.

TABLE 8

Monte Carlo Simulations of Two-Fiber Model

| Configuration | 1 | 1 | 1 | 2 | 2 | 2 |
|---|---|---|---|---|---|---|
| No. generated photons in fiber 1 | 5000 | 5000 | 5000 | 5000 | 5000 | 5000 |
| No. detected photons in fiber 1 | 2716 | 2700 | 2677 | 2371 | 2339 | 2364 |
| No. photons escaping fiber 1 | 457 | 470 | 434 | 1050 | 1088 | 1056 |
| No. detected photons in fiber 2 | 0 | 0 | 0 | 611 | 659 | 633 |

In the first configuration (no interpenetration of the fibers), the simulation showed that about 54% of the emitted photons were detected in fiber 1, about 9% escaped fiber 1 and entered fiber 2, but none were detected in fiber 2. This indicates that it was not possible for any photon to pass from fiber 1 to fiber 2 and then to propagate by total internal reflection.

In the second configuration (interpenetration of fibers), about 47% of the emitted photons were detected in fiber 1, about 21% went into fiber 2, and about 12% were detected in fiber 2. This indicates that for a configuration where the fibers have a unique contact point, no photon passing from a first fiber into a second one could be detected in the second fiber at a reasonable distance from the emission. However, when the fibers interpenetrate, some such photons can be detected in the second fiber.

EXAMPLE 6

A second set of Monte Carlo simulations were performed, this time with multifiber (1 mm diameter for each fiber) configurations. First, a configuration was modeled in which a single fiber running in the X direction was in optical contact with 100 orthogonal fibers running in the Y direction. The simulation employed the same assumptions as in Example 5, and further assumed that the photons were generated in the X fiber within a circular cross-section around the origin. Of the 100 photons emitted in the single X fiber, about 44% were detected in the X fiber, and about 12.5% were detected in the corresponding position in the Y fibers. FIG. 8 shows the distribution of detected photons in Y fibers to either side of the point of origin in the X fiber. As the figure shows, the number decreases rapidly in either direction from the origin.

FIG. 9 shows the numbers of photons detected in the fibers when the interplane distance was varied. While the number of photons detected in the X fiber rapidly increases as the interplane distance increases, the number of photons detected in the corresponding Y fiber decreases to reach zero when the two layers do not interpenetrate at all.

Simulations were also done to study the influence of the interplane angle (i.e., the angle between the fiber in the X axis with the fibers in the Y axis) on detection of photons. The principal result of decreasing the interplane angle from 90° was to blur the intrinsic resolution of the fiber. The apparent resolution of photon detection in a particular Y fiber along the X axis was decreased because the Y fiber was detecting a larger volume along the X axis. However, since the detection volume was bigger, the number of detected photons increased. This gain in detection was small even for a marked rotation. For example, an interplane angle of 30° caused an increase in Y fiber detection of only 16%, while the resolution along the X axis changed from 1 mm to 2 mm. The number of photons detected in the X fiber did not change notably (a decrease of 4.5% when the angle is diminished to 30°).

Simulation of different attenuation coefficients for the fibers indicated that this parameter plays a secondary role in the efficiency and resolution of the system.

Next, a similar set of simulations was done based on a configuration where two orthogonal layers, an X layer and a Y layer, of fibers were used. Twenty-one fibers were in each plane, the fibers had a diameter of 1 mm, the interplane distance was 0.94 mm, and 5000 photons were generated in a single fiber in the X plane. FIG. 10 shows the distribution of detected photons as one moves to either side of the origin. Of all the photons emitted in the X fiber of origin, about 25.8% were detected in that X fiber, about 2% in directly adjacent X fibers, 1.6% in the corresponding Y fiber, and about 0.7% in adjacent Y fibers. This indicates that it is possible to determine precisely the position of photon emission.

FIG. 11 shows the effect of varying the interplane distance in the multifiber simulation. For 1 mm diameter fibers, 0.94 mm interplane distance (i.e., interpenetration of 0.06 mm) appeared to be a reasonable compromise between efficiency and the practicalities of machining the fibers to create optical contact.

As before, varying the interplane angle from 90° did not bring any improvement in the photon detection efficiency and decreased the resolution along the X axis. Further, it was found that the detection efficiency decreased as the number of fibers per layer increased. In addition, as the number of fibers per layer increased, the interplane distance became more critical and less controllable by machining.

In conclusion, the experimental data show that conference sensing can be achieved using the simple method of creating optical contact by mechanical means alone (removal of cladding, polishing the exposed surface, and using optical gel coupling); that transfer of information using light transmission is typically a factor of 10 more efficient than electron transport across two fibers for energies of interest in imaging; and that conference sensing works down to very low energies.

The preceding description is intended to illustrate certain embodiments of the present invention. It is not intended to be and exhaustive list of all possible embodiments. Those skilled in this field will recognize that modifications could be made which would remain within the scope of the invention.

We claim:

1. Apparatus for detecting and locating the origin of a gamma ray in a medical diagnostic imaging system, including:
   at least one primary fiber which is a scintillating optical fiber having a core and a cladding and is positioned to receive radiation from a gamma ray source;
   at least one secondary fiber which is an optical fiber having a core and a cladding, and which intersects the at least one primary fiber at a non-zero angle and is optically coupled with and in physical contact with the at least one primary fiber;
   a plurality of means for detecting light which are coupled to the at least one primary fiber and the at least one secondary fiber; and
   means for collecting and processing data from the plurality of means for detecting light, to locate the origin of the gamma ray.

2. The apparatus of claim 1, where the apparatus includes a plurality of primary optical fibers and a plurality of secondary optical fibers, each having a core and a cladding, where the primary fibers are arranged substantially parallel to each other in a first plane, and where the secondary fibers are arranged substantially parallel to each other in a second plane which is parallel and adjacent to the first plane.

3. The apparatus of claim 2, where the primary fibers are orthogonal to the secondary fibers.

4. The apparatus of claim 2, where each secondary fiber is optically coupled with and in physical contact with at least one primary fiber at a point where that secondary fiber intersects that primary fiber.

5. The apparatus of claim 1, where the at least one secondary fiber is nonscintillating.

6. The apparatus of claim 1, where at least one the primary fiber has a notch formed in it, where the at least one secondary fiber is positioned in the notch in the at least one primary fiber, and where light can be transmitted from the at least one primary fiber to the at least one secondary fiber through the notch.

7. The apparatus of claim 1, where an optical coupling agent is located between the at least one primary fiber and the at least one secondary fiber at the point at which they are in physical contact to establish optical coupling between them.

8. The apparatus of claim 1, further including means for using the collected and processed data to generate a three-dimensional tomographic image.

9. Apparatus for detecting and locating the origin of a gamma ray in a medical diagnostic imaging system, including:
   an array of optical fibers, each having a core and a cladding, which includes a plurality of layers which are located in parallel planes that are adjacent one to the next, where each layer includes a plurality of substantially parallel fibers that form an angle between 60°–90° with the fibers in the layer immediately above and to the fibers in the layer immediately below where at least one of the plurality of layers of optical fibers comprises a layer of scintillating optical fibers where each fiber is optically coupled with and in physical contact with at least one fiber in an adjacent layer, and where the array of fibers is positioned to receive radiation from a gamma ray source;
   a plurality of position sensitive photomultipliers coupled to the fibers in the array for detecting light generating in the fibers; and
   means for collecting and processing data from the position sensitive photomultipliers to locate the origin of the gamma ray.

10. The apparatus of claim 9, further including means for using the collected and processed data to generate a three-dimensional tomographic image.

11. A method for detecting and locating the origin of a gamma ray in a patient as part of a medical diagnostic imaging system, including the steps of:

emitting a gamma ray from a gamma ray source in a patient's body;

ejecting an electron in a primary fiber which is a scintillating optical fiber having a core and a cladding as a result of an interaction between the gamma ray and the scintillating optical fiber, thereby causing the emission of visible light quanta in the primary fiber;

transferring a portion of the light quanta from the primary fiber to a secondary optical fiber having a core and a cladding which intersects the primary fiber at a non-zero angle and is optically coupled with and in physical contact with the primary fiber;

detecting the light quanta from the primary fiber and the secondary fiber; and determining the location of the interaction between the gamma ray and the primary fiber by identifying the location of the optical coupling between the primary fiber and the secondary fiber.

12. The method of claim 11, further including using the determined location of the interaction to generate a three-dimensional tomographic image.

13. A method for detecting and locating the origin of a gamma ray in a patient as part of a medical diagnostic imaging system, including the steps of:

(a) emitting a gamma ray from a gamma ray source in a patient's body;

(b) ejecting an electron in a primary optical fiber, which is part of a layer of substantially parallel primary scintillating optical fibers, each having a core and a cladding, located in a first plane, as a result of an interaction between the gamma ray and the primary fiber, thereby causing the emission of visible light quanta in the primary fiber;

(c) transferring a portion of the light quanta from the primary fiber to a secondary optical fiber, which is optically coupled with and in physical contact with the primary fiber, and which is part of a layer of substantially parallel optical fibers, each having a core and a cladding, that form a non-zero angle with the primary fibers and are located in a second plane that is parallel to the first plane;

(d) detecting which fibers in the layer of primary fibers and which fibers in the layer of secondary fibers propagate light quanta at substantially the same time; and (e) determining the location of the interaction between the gamma ray and the primary fiber by identifying the location of the optical coupling between the primary fiber which propagated light and the secondary fiber which propagated light.

14. The method of claim 13, further comprising the steps of:

(f) emitting a second gamma ray from the gamma ray source in the patient's body at substantially the same time as the gamma ray of step (a) is emitted, with the second gamma ray being emitted in the opposite direction from the gamma ray of step (a);

(g) ejecting a second electron in a primary optical fiber, which is separate from the primary fiber of step (b) and which is located on the opposite side of the patient's body from the primary fiber of step (b), and which is part of a layer of substantially parallel primary scintillating optical fibers, each having a core and a cladding, located in a third plane, as a result of an interaction between the gamma ray of step (f) and the associated primary fiber, thereby causing the emission of visible light quanta in the associated primary fiber;

(h) transferring a portion of the light quanta of step (g), from the primary fiber of step (g) to a secondary optical fiber, which is separate from the secondary fiber of step (c), and which is optically coupled with and in physical contact with the primary fiber of step (g), and which is part of a layer of substantially parallel optical fibers, each having a core and a cladding, that form a non-zero angle with the primary fibers of step (g) and are located in a fourth plane that is parallel to the third plane;

(i) detecting which fibers in the layer of primary fibers of step (g) and which fibers in the layer of secondary fibers of step (h) propagate light quanta at substantially the same time; and (j) determining the location of the interaction between the second gamma ray and the primary fiber of step (g) by identifying the location of the optical coupling between the primary fiber which propagated light and the secondary fiber which propagated light.

15. The method of claim 14, further including using the determined location of the interaction from step (j) to generate a three-dimensional tomographic image.

16. The method of claim 13, further comprising the steps of:

(f) measuring the intensity of the light produced in the primary fiber of step (b);

(g) ejecting a second electron in a primary optical fiber at substantially the same time at which the electron of step (b) is ejected, which primary fiber is separate from the primary fiber of step (b) and which is located on the same side of the patient's body as the primary fiber of step (b), and which primary fiber is part of a layer of substantially parallel primary scintillating optical fibers, each having a core and a cladding, located in a third plane, as a result of an interaction between the same gamma ray of step (a) and the associated primary fiber, thereby causing the emission of visible light quanta in the associated primary fiber;

(h) transferring a portion of the light quanta from the primary fiber of step (g) to a secondary optical fiber, which is optically coupled with and in physical contact with the primary fiber of step (g), and which secondary fiber is separate from the secondary fiber of step (c) and is part of a layer of substantially parallel optical fibers, each having a core and a cladding, that are orthogonal to the primary fibers and are located in a fourth plane that is parallel to the third plane;

(i) detecting which fibers in the layer of primary fibers of step (g) and which fibers in the layer of secondary fibers of step (h) propagate light quanta at substantially the same time;

(j) determining the location of the interaction between the gamma ray and the primary fiber of step (g) by identifying the location of the optical coupling between the primary fiber which propagated light and the secondary fiber which propagated light; and (k) determining the direction of the gamma ray emitted in the patient's body by determining the line joining the location of step (e) and the location of step (j), and determining the electron energy corresponding to the light intensity of step (f).

17. The method of claim 16, further including using the determined location of the interaction from step (j) and the determined direction of the gamma ray from step (k) to generate a three-dimensional tomographic image.

18. The method of claim 13, further including using the determined location of the interaction from step (e) to generate a three-dimensional tomographic image.

* * * * *

UNITED STATES PATENT AND TRADEMARK OFFICE
CERTIFICATE OF CORRECTION

PATENT NO. : 5,281,821
DATED : January 25, 1994
INVENTOR(S) : Antich et al

It is certified that error appears in the above-indentified patent and that said Letters Patent is hereby corrected as shown below:

At column 7, line 65, the period at the beginning of the line should instead appear at the end of line 64.

At column 12, line 26, "emitted. photons" should read --emitted photons--.

At column 13, line 59, "and" should read --an--.

In claim 6, at column 14, line 31, "at least one the" should read --the at least one--.

In claim 9, at column 14, line 65, "generating" should read --generated--.

Signed and Sealed this

Twenty-first Day of June, 1994

Attest:

BRUCE LEHMAN

*Attesting Officer*   *Commissioner of Patents and Trademarks*